United States Patent
Jin et al.

(10) Patent No.: US 10,096,319 B1
(45) Date of Patent: Oct. 9, 2018

(54) VOICE-BASED DETERMINATION OF PHYSICAL AND EMOTIONAL CHARACTERISTICS OF USERS

(71) Applicant: Amazon Technologies, Inc., Seattle, WA (US)

(72) Inventors: Huafeng Jin, Sammamish, WA (US); Shuo Wang, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/457,846

(22) Filed: Mar. 13, 2017

(51) Int. Cl.
| | |
|---|---|
| *G10L 21/00* | (2013.01) |
| *G06F 17/00* | (2006.01) |
| *G10L 15/22* | (2006.01) |
| *G10L 15/30* | (2013.01) |
| *G10L 25/63* | (2013.01) |
| *G10L 25/66* | (2013.01) |
| *G10L 25/84* | (2013.01) |
| *G10L 15/08* | (2006.01) |

(52) U.S. Cl.
CPC .............. *G10L 15/22* (2013.01); *G10L 15/08* (2013.01); *G10L 15/30* (2013.01); *G10L 25/63* (2013.01); *G10L 25/66* (2013.01); *G10L 25/84* (2013.01); *G10L 2015/088* (2013.01)

(58) Field of Classification Search
CPC .......... G10L 21/00; G10L 15/00; G06F 17/60
See application file for complete search history.

(56) References Cited

U.S. PATENT DOCUMENTS

| | | | | |
|---|---|---|---|---|
| 6,665,644 B1* | 12/2003 | Kanevsky | ............... | G10L 17/26 704/246 |
| 9,070,357 B1* | 6/2015 | Kennedy | .................. | G10L 15/00 |
| 9,177,557 B2* | 11/2015 | Talwar | .................... | G10L 17/02 |
| 2004/0243443 A1* | 12/2004 | Asano | .................... | G06Q 10/10 705/2 |
| 2013/0339028 A1* | 12/2013 | Rosner | .................. | G10L 15/222 704/275 |
| 2014/0025623 A1* | 1/2014 | Lindhiem | ............... | G16H 50/20 706/52 |
| 2014/0074454 A1* | 3/2014 | Brown | .................. | G06F 19/345 704/9 |
| 2017/0076740 A1* | 3/2017 | Feast | ....................... | G10L 25/63 |

\* cited by examiner

*Primary Examiner* — Shreyans A Patel
(74) *Attorney, Agent, or Firm* — Eversheds Sutherland (US) LLP

(57) ABSTRACT

Systems, methods, and computer-readable media are disclosed for voice-based determination of physical and emotional characteristics of users. Example methods may include determining first voice data, wherein the first voice data is generated by a user, determining a first real-time user status of the user using the first voice data, generating a first data tag indicative of the first real-time user status, determining first audio content for presentation at a speaker device using the first data tag and the first voice data, and causing presentation of the first audio content via a speaker of the speaker device.

19 Claims, 5 Drawing Sheets

VOICE-BASED DETERMINATION OF PHYSICAL AND EMOTIONAL CHARACTERISTICS OF USERS

BACKGROUND

Users may consume audio content via a number of content consumption devices. Certain content consumption devices may be configured to receive voice-based commands, or may otherwise be configured to recognize speech. Voice input from users to such devices may reflect a physical or emotional characteristic of the user. Accordingly, determining a physical or emotional characteristic of a user using a voice input may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
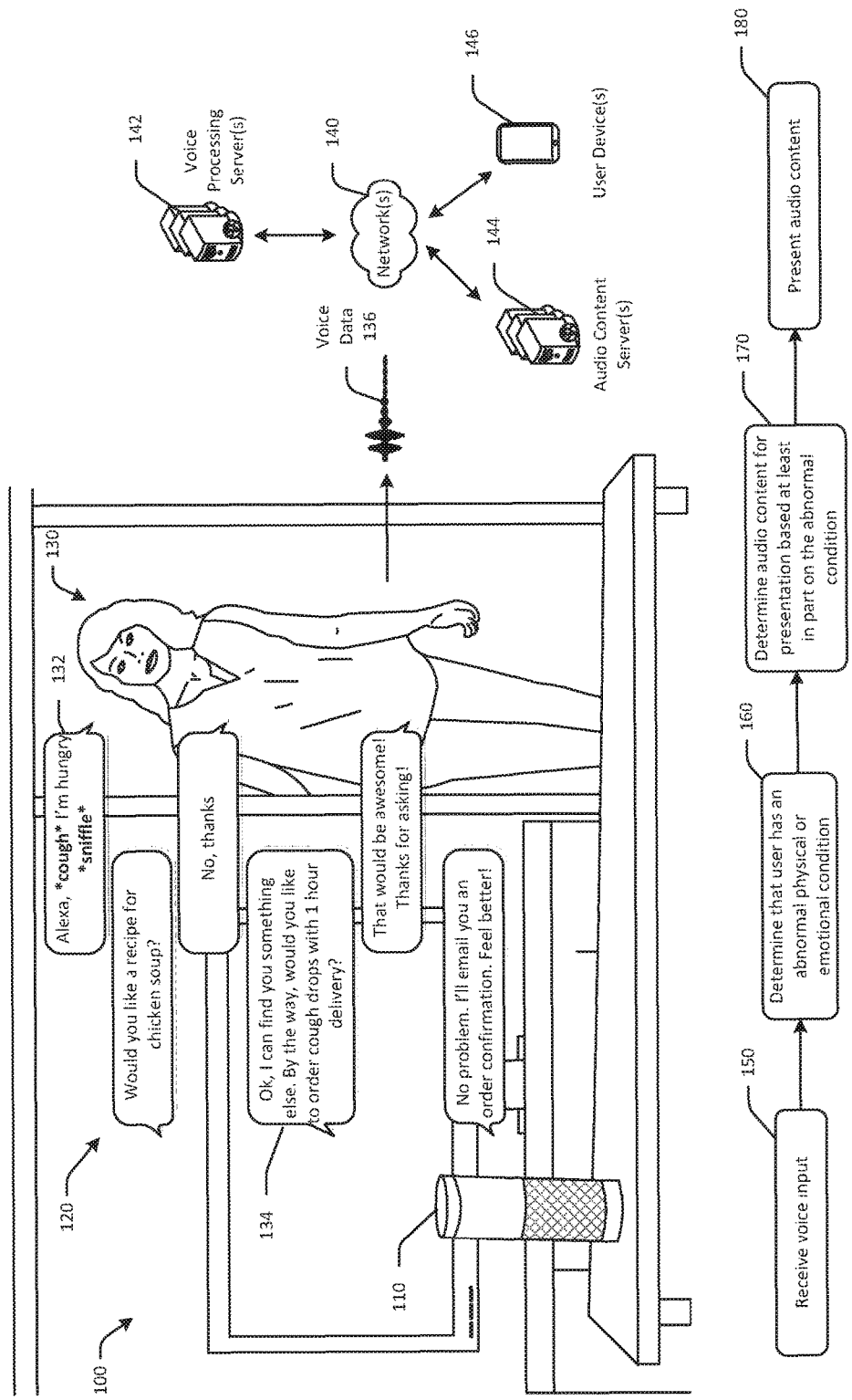
FIG. 1 is a schematic diagram of an example use case illustrating voice-based determination of physical and emotional characteristics of users in accordance with one or more example embodiments of the disclosure.

Content consumption devices, such as audio streaming devices and other speaker devices, may be configured to determine and/or respond to voice-based commands. For example, an audio streaming device may respond to voice-based commands to play music, order goods or services, modify home settings, report news, and the like. Voice-based commands may be provided via one or more voice inputs from a user.

Certain embodiments of the disclosure may determine one or more physical and/or emotional characteristics of a user based at least in part on a voice input from the user. For example, physical conditions such as sore throats and coughs may be determined based at least in part on a voice input from the user, and emotional conditions such as an excited emotional state or a sad emotional state may be determined based at least in part on voice input from a user.

Determined physical and/or emotional states or conditions of a user may be used to select or determine relevant audio or visual content for presentation to the user. Selected or determined content may be highly targeted due to the real-time determination of the physical and/or emotional characteristics of the user, and may therefore be timely and relevant to the user's current state. Embodiments of the disclosure may use physical and/or emotional characteristics of a user in combination with behavioral targeting criteria (e.g., browse history, number of clicks, purchase history, etc.) and/or contextual targeting criteria (e.g., keywords, page types, placement metadata, etc.) to determine and/or select content that may be relevant for presentation to a user.

This disclosure relates to, among other things, devices, systems, methods, computer-readable media, techniques, and methodologies for voice-based determination of physical and emotional characteristics of users. Certain embodiments may include voice assistants that process voice or speech and/or determine a meaning of the voice or speech, and may engage in conversations with users. Some embodiments may determine one or more voice features based at least in part on the speech or voice input from a user. For example, voice features may include a gender of the user, an age or age range of the user, an ethnic origin or language accent of the user, an emotion of the user, a background noise of the environment in which the user is located, and other voice features. As a result, content presented at a device may be specific to the user that is using the device (e.g., providing a voice input, etc.), as opposed to a user associated with the device, such as an owner of the device.

To determine voice features, embodiments may apply one or more signal processing profiles to a digital representation of the voice input from a user. Some embodiments may process digital representations of voice input, or voice input that has been processed with a signal processing profile, using one or more voice processing algorithms. Outputs of the one or more voice processing algorithms may be used to determine whether a user is, or is likely, experiencing a certain emotional characteristic and/or has a certain physical trait or characteristic.

In the event a physical characteristic or emotional characteristic is determined, one or more tags associated with the respective physical or emotional characteristic may be generated and associated with or linked to a data file of the voice input. The one or more tags may be used to determine content for presentation to the user. For example, content that includes targeting criteria for the specific physical and/or emotional characteristics that a user has may be selected for presentation to the user. Other targeting criteria may also be used. As a result, timely and relevant content may be selected for presentation to the user.

Embodiments of the disclosure may generate audible responses to voice input, where the audible response includes the selected content. By determining physical and/or emotional characteristics of users using their speech, embodiments of the disclosure may identify or determine transient characteristics or properties of a user and/or a person using a particular device, which can be used to select highly relevant content for presentation to the user at that particular time, and which may not be relevant later. Certain embodiments may therefore have increased functionality, for example, with respect to user requests made via speech and/or for presentation of unsolicited content to users. For example, a user may utter the phrase "what's going on today?" Embodiments of the disclosure may determine, based at least in part on one or more outputs of algorithms applied to a digital representation of the user utterance, that the user is or is likely in a bored emotional condition, and may generate an audible response, or query, of, for example, "are you in the mood for a movie?" The user may reply to the audible response to continue a conversation. By determining that the user is currently bored, a relevant audible response may be generated and may be used in conjunction with a meaning of the user's voice input (e.g., "what's going on today?") to select relevant and timely content for presentation.

Embodiments of the disclosure may facilitate voice-based determination of physical and emotional characteristics of users, such that voice assistants may engage in relevant conversation with users, and such that voice features can be used to target audio content. Embodiments of the disclosure may include voice processing or speech recognition systems. Such systems may employ techniques to identify words spoken by a human user based on the various qualities of a received audio input. Speech recognition may be combined with natural language understanding processing techniques to enable speech-based user interaction with a computing device to perform tasks based on the user's spoken commands, or to engage in a conversation with a user. Speech processing may also convert a user's speech into text data which may then be provided to various text-based software applications.

Referring to FIG. 1, an example use case for voice-based determination of physical and emotional characteristics of users is illustrated in accordance with one or more embodiments of the disclosure. An environment 100 may include a voice interaction device 110 that a user 130 can interact with. The voice interaction device 110 may communicate with one or more voice processing servers 142, one or more audio content servers 144, and/or one or more user devices 146 via one or more communication networks 140. The voice interaction device 110 may determine (or facilitate a determination of) a meaning of utterances spoken by the user 130, and may generate audible content 120, such as comments, inquiries, jingles, sounds, and other responses, in response to user utterances. Audible content 120 may be targeted or sponsored content and, in some embodiments, may be third-party content. The user 130 may interact with the voice interaction device 110, for example via a voice assistant or other audible or sound-based interaction technique. In some embodiments, the user 130 may interact with the voice interaction device 110 by providing analog sound input 132 (e.g., voice) to the voice interaction device 110. The voice interaction device 110 may receive or detect the analog sound input 132 and may generate digital voice data 136 representative of the analog sound input. The voice interaction device 110 may send the voice data 136 to the one or more voice processing server(s) 142 over the one or more wired or wireless communication networks 140 to determine a meaning of the sound input, or voice data 136. In some embodiments, the voice interaction device 110 may perform voice processing on the voice data 136 locally. While FIG. 1 illustrates an embodiment where audible content 120 is presented during user interaction with a voice assistant, in other embodiments, audible content may be presented during third-party content presentation, such as during a streaming music playlist or other third-party content.

The voice interaction device 110 may be configured to generate the audible content 120 and may be, for example, a device such as a television, a laptop computer, a tablet, a computer monitor, a streaming audio device, a speaker-type device, augmented reality or virtual reality glasses or devices, or another device configured to output audio. The voice interaction device 110 may include or may utilize a speech interface device or other audio device, such as one or more speakers, that are capable of playing or presenting various types of audio. The voice interaction device 110 may include one or more microphones to detect ambient sound. The voice interaction device 110 may be located within the environment 100, such as a home, to provide services for the user 130. The voice interaction device 110 may operate in conjunction with and/or under the control of a remote network-based speech command service (e.g., voice processing server(s) 142, audio content server(s) 144, etc.) that is configured to receive audio, to recognize speech in the audio, and to perform functions or services in response to the recognized speech, or to generate audible dialog or audible content in response to recognized speech. The voice interaction device 110 may have one or more microphones and one or more audio speakers or transducers to facilitate speech interactions with the user 130. The voice interaction device 110 may have a network communications interface for communicating over one or more communication networks 140. The voice interaction device 110 may receive spoken expressions or utterances from the user 130 and may provide services, perform actions, or facilitate conversation or dialogue in response to the spoken utterances. For example, the user may speak an utterance with a verbal request or sound input. In some embodiments, the voice interaction device 110 may only be activated to listen upon determining that the user 130 has spoken a predefined wake or trigger expression (e.g., "Awake" or "Alexa," etc.), which may be followed by an utterance (e.g., "I'd like to go to a movie."). Provided services may include performing actions or activities, rendering media, obtaining and/or providing information, providing information via generated or synthesized speech via the voice interaction device 110, initiating Internet-based services on behalf of the user 130, performing actions relating to home automation and control, and so forth.

In the example of FIG. 1, the user 130 may initiate a conversation with the voice interaction device 110 by speaking "Alexa, I'm hungry." During the initial voice input, the user 130 may cough and/or sniffle. For example, the user 130 may audibly cough after the word "Alexa," and may audibly sniffle after completing the phrase or utterance. In this embodiment, "Alexa" may be a wakeword, and the voice interaction device 110 may detect or determine that a wakeword was spoken. In some embodiments, the voice interaction device 110 may not need to be triggered or engaged with a wakeword.

FIG. 1 depicts an example process flow in accordance with one or more embodiments of the disclosure. At block 150, the voice interaction device 110 may receive verbal input. For example, the voice interaction device 110 may receive the utterance "Alexa, *cough* I'm hungry *sniffle*" spoken by the user 130, where the cough is an audible cough and the sniffle is an audible sniffle. The voice interaction device 110 may receive the verbal input or voice input via an audio capture component, such as a microphone.

At block 160 of the process flow, the voice interaction device 110 may determine that the user 130 has an abnormal physical or emotional condition. For example, the voice interaction device 110 may determine that the user coughed while uttering the phrase, and/or that the user sniffled after completion of the phrase. Accordingly, the voice interaction device 110 may determine that the user has an abnormal physical condition. Based at least in part on the determination that the user has an abnormal condition, the voice interaction device 110 may determine, or may facilitate determination of (e.g., by the voice processing server(s) 142, etc.), a particular abnormality that is applicable to the user. For example, the voice interaction device 110 may send a notification to the voice processing server(s) 142 that an abnormality has been detected, and the voice processing server(s) 142 may determine one or more applicable abnormalities. In other embodiments, the voice processing server(s) 142 may determine the presence of an abnormality in the voice input.

To determine a specific abnormality, one or more voice processing algorithms or signal processing profiles may be applied to the voice data 136. For example, one or more voice processing algorithms to determine whether a user has a sore throat may be selected for use on the voice data 136 based at least in part on the detection of the cough and/or the sniffle from the user. Any number of voice processing algorithms and/or signal processing profiles may be selected and applied to the voice data 136 to determine the user's physical or emotional condition. Preliminary determinations, such as detections of a cough or other feature, may be made at the voice interaction device 110 in some embodiments.

In one example, the voice interaction device 110 may communicate with the voice processing server(s) 142 to determine a physical and/or emotional state of the user 130 based at least in part on the utterance or voice input from the user. A current physical and/or emotional condition of the user may facilitate the ability to provide highly targeted audio content, such as audio advertisements or promotions, to the user 130.

In FIG. 1, the voice interaction device 110 may optionally determine a follow-up inquiry of "would you like a recipe for chicken soup?" in response to the user's utterance regarding hunger. Follow-up inquiries may be determined by identifying a keyword or category associated with a particular user utterance. For example, the word "hungry" may trigger a follow-up inquiry associated with "food," "restaurants," or "recipes." Follow-up inquiries may be associated with particular advertisers in some embodiments. In the example of FIG. 1, Panera Bread may be interested in presenting an audio advertisement to the user 130. As a result, the follow-up inquiry of "would you like to order chicken soup?" may be directed towards determining whether the user 130 is a target consumer for receiving a Panera Bread audio advertisement. In some embodiments, follow-up inquiries may be provided by advertisers, while in other embodiments follow-up inquiries may be provided by other entities. The follow-up inquiry may be a direct response to the user's inquiry (e.g., "Alexa, I'm hungry"), and may or may not be determined based at least in part on the user's physical or emotional condition. The user 130 may reply to the follow-up inquiry with "No, thanks."

At block 170 of the process flow, the voice interaction device 110 may determine audio content for presentation based at least in part on the determined abnormal physical or emotional condition. For example, the user 130 may be determined to have a sore throat based at least in part on voice processing of the voice data 136. Accordingly, the abnormal physical condition for the user 130 may be a sore throat. The voice interaction device 110 and/or the voice processing server(s) 142 may communicate with the audio content server(s) 144 to select content for presentation to the user based at least in part on the sore throat. For example, certain content, such as content related to cough drops or flu medicine, may be targeted towards users who have sore throats.

Based at least in part on the user's specific physical and/or emotional condition, as well as any other applicable targeting criteria, such as age, demographic, browsing history, etc., content may be selected for presentation to the user. Content that is selected for presentation may be presented as standalone content or may be appended to other content or may be presented prior to presentation of requested content, such as news briefing, weather forecasts, and the like. In some embodiments, an auction process may be held to determine content for presentation. For example, the voice interaction device 110 may facilitate an auction for an available audio advertisement slot for presentation to the user 130 (e.g., by acting as an interface for user input, etc.). The auction may include sending bid requests to one or more advertisers and determining a winning bid. In some embodiments, a relevance threshold may be established to ensure that the winning bid is associated with an audio advertisement or advertiser that is relevant to the conversation the voice interaction device 110 is having with the user 130. The relevance threshold may be alphanumeric or may be category-based. For example, a fine dining restaurant advertiser may be excluded from presenting an audio advertisement to a user that is interested in fast food. In another example, if the user 130 has indicated that he or she does not like a certain fast food establishment, that fast food establishment may be prevented from presenting audio advertisements to the user 130.

At block 180, the voice interaction device 110 may present the audio content. In the example of FIG. 1, the selected content may be an offer to purchase or order cough drops with expedited delivery. The content may be selected based at least in part on the likelihood that the user has a sore throat and/or the physical or emotional abnormality detected in the user's voice input. The selected content may be appended to the end of other content. For example, the voice interaction device 110 may playback audio via one or more speakers associated with the voice interaction device 110 that says "OK, I can find you something else," which may be in response to the user 130 declining a recipe for chicken soup. The voice interaction device 110 may then audibly state or playback the selected content via one or more speakers associated with the voice interaction device 110 at communication 134, which may be "by the way, would you like to order cough drops with 1 hour delivery?" The user 130 may respond affirmatively, indicating that the user would like to purchase the cough drops by stating "that would be awesome! Thanks for asking!" The voice interaction device 110 may determine that the user 130 responded to the offer affirmatively and may initiate an order or a purchase of the cough drops. The voice interaction device 110 may confirm the transaction by playing audio content that says "no problem. I'll email you an order confirmation." The voice interaction device 110 may optionally initiate sending an order confirmation message to the user device 146 associated with the user 130. The voice interaction device 110 may append a message to the audible confirmation, such as well wishes, or "feel better!" Such messages may be selected based at least in part on the order that was placed by the user, the abnormality in the user's voice, and/or the user's current physical or emotional condition.

In the example of FIG. 1, the cough drops manufacturer may have targeted users with sore throats for the promotional offer that was presented to the user 130. The targeting criteria for the promotional offer, or the offer generally, may include users with sore throats or users likely to have sore throats.

The systems, methods, computer-readable media, techniques, and methodologies for voice-based determination of physical and emotional characteristics of users may facilitate presentation of timely and relevant content to users leading to an increased ability to determine a user intent and/or anticipate a user's needs or desires. The user intent may be used to determine audio content that is relevant to the user, such as audio advertisements or other audio content, that can be presented to the user, where the audio content is highly relevant and timely to the user's current desires and situation.

Example embodiments of the disclosure provide a number of technical features or technical effects. For example, in accordance with example embodiments of the disclosure, certain embodiments of the disclosure may provide audio channels for targeted audio content, such as audio advertising. Due to the serial workflow of audio content, in that singular audio content may be presented at the same time (e.g., two songs should not be played at once, etc.), presentation of audio content is distinguished from visual or graphic content. As a result, interaction with audio content, such as audio advertisements, is also distinguished from visual content. Embodiments of the disclosure may generate audio content, such as audio advertisements, based at least in part on interactions with a voice assistant. Embodiments of the disclosure may be used to facilitate presentation of audio content to users who have one or more selected voice feature combinations. Embodiments of the disclosure may inject interactive audio advertisements on demand into other audio content (e.g., a music playlist, etc.). The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
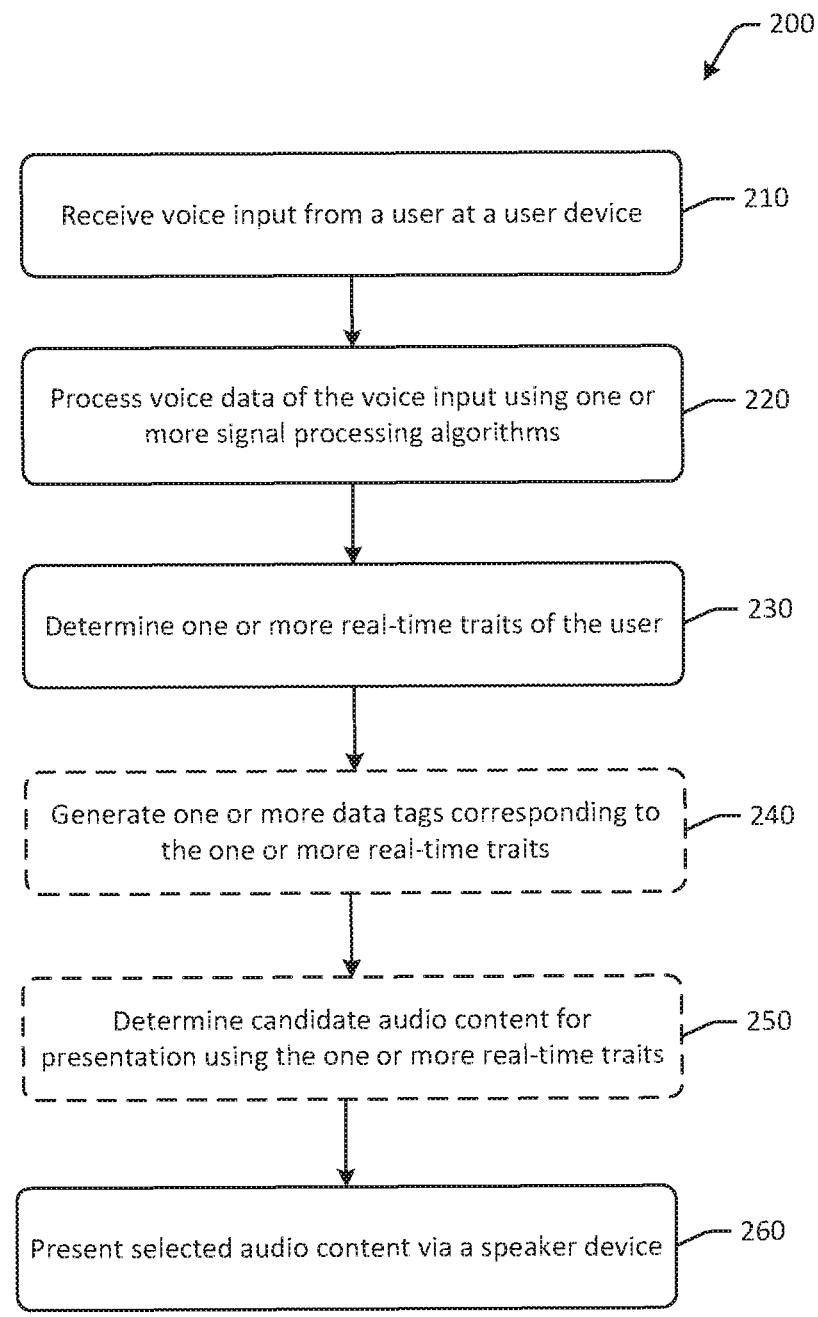
FIG. 2 is a schematic illustration of an example process flow for voice-based determination of physical and emotional characteristics of users in accordance with one or more example embodiments of the disclosure.

FIG. 2 depicts an example process flow 200 for voice-based determination of physical and emotional characteristics of users in accordance with one or more embodiments of the disclosure. While example embodiments of the disclosure may be described in the context of voice interaction devices, it should be appreciated that the disclosure is more broadly applicable to any user device configured to generate audio, and some or all of the blocks of the process flows in this disclosure may be performed in a distributed manner across any number of devices. The operations of the process flow 200 may be performed in a different order.

At block 210 of the process flow 200, voice input from a user at a user device may be received. For example, computer-executable instructions stored on a memory of a device, such as a voice interaction device, may be executed to receive voice input at a user device. A voice interaction device may include one or more processors and at least one memory communicatively coupled to the one or more processors. The voice interaction device may be configured to receive and transmit or send information via wired or wireless communication. The voice interaction device may include one or more microphones or other audio input device, and may include or otherwise be coupled to one or more speakers or speaker devices in some embodiments. The voice interaction device may receive voice input as analog sound input via one or more microphones. The voice input may be processed to generate voice data, or another digital representation of the voice input. Some or all of the operations in FIG. 2 may be performed by a device, such as a voice interaction device, while in some embodiments, some or all of the operations in FIG. 2 may be performed by computer systems connected to a voice interaction or other device.

In some embodiments, the voice input may be analyzed to determine whether the voice input included a wakeword or a trigger word. A trigger word may be a word of a set of one or more trigger words that indicates a type of request included in the voice input. Example types of requests, as described herein, may include search requests, such as content search requests; verbal queries, such as requests for information, including weather, news, and other information; requests for suggestions, including for activities, food, and other suggestions; and the like. Trigger words may be identified by comparing one or more words of the voice input to a table including the set of one or more trigger words. Identification of trigger words may be performed locally at the device in some embodiments, while in other embodiments, the device may receive an indication that the voice input included a trigger word, such as from one or more remote servers. In some embodiments, positioning or arrangement of words in the voice input may be used in determining whether the voice input includes a trigger word. For example, in some embodiments, if the first character or word of the voice input is not a trigger word, the voice input may be considered or determined to not include a trigger word.

At block 220 of the process flow 200, voice data of the voice input may be processed using one or more signal processing algorithms. For example, computer-executable instructions stored on a memory of a device may be executed to determine a meaning of the voice input. In one embodiment, a voice interaction device may select one or more voice processing or signal processing algorithms to apply to the voice data. In other embodiments, a remote server, such as a voice processing server, may select one or more voice processing algorithms to apply to the voice data. Voice processing algorithms may be applied in a specific sequence, and/or may be selected for application based at least in part on one or more abnormalities, such as a cough or other abnormality, that appear in the voice data. In some embodiments, the voice data may be processed locally, while in other embodiments, the voice data may be sent to one or more remote servers for voice processing.

At block 230 of the process flow 200, one or more real-time traits of the user may be determined. For example, computer-executable instructions stored on a memory of a device may be executed to determine one or more real-time traits of the user based at least in part on the output(s) of the one or more signal or voice processing algorithms that were applied to the voice input. Traits may include physical characteristics of a user (e.g., gender, age, ethnic origin, etc.), a physical condition or state of a user (e.g., sore throat, sickness, etc.), an emotional condition or state of a user (e.g., happy, sad, tired, sleepy, excited, etc.), and other traits. The one or more traits may be real-time, in that the traits reflect a current condition or state of the user. The user may be experiencing multiple emotions or may have more than one identifiable physical condition or characteristic via the voice input. A real-time user status may represent one or more physical or emotional conditions or characteristics of the user.

In one example, a first voice processing or signal processing algorithm may be used to process the voice data to determine a first real-time user status of the user using the first voice data. The first voice processing algorithm may be used to determine an emotional state of the user. Detectable or determinable emotions may include, among others, default or normal, happiness, joy, anger, sorrow, sadness, fear, disgust, boredom, stress, and other emotional states. Emotional states or conditions may be determined based at least in part on an analysis of pitch, pulse, voicing, jittering, and/or harmonicity of a user's voice, as determined from processing of the voice data. Pulse data may include a number of pulses, a number and mean of the periods, and/or a standard deviation of the periods. Voicing may use unvoiced frames and may calculate the number and percentage unvoiced frames. Local shimmer may be an average absolute difference between amplitudes of consecutive periods, divided by an average amplitude. Local jitter may be one or more of an average absolute difference between consecutive periods divided by an average period. Features used for voice processing algorithms may include Mel-frequency cepstral coefficients (MFCCs). Cepstral features may be represented on a nonlinear spectrum of a spectrum (e.g., derived by taking the Fourier transform of the logarithm of a spectrum, etc.). Cepstral features are be converted to the MFCC scale, which may be designed to approximate the response of human hearing by emphasizing frequencies to which humans are sensitive. Other forms of classification may include support vector machines (SVMs), K-nearest neighbors, and/or decision trees.

Based at least in part on one or more determined emotions, the device or a connected computer system may determine that the emotional state of the user is abnormal. An abnormal emotional state may be an emotional state that is different than a default or normal/baseline state. The default or normal state may be specific to the user (e.g., an owner or regular user of the device), or may be applicable to any user.

If it is determined that the user has an abnormal emotional state, the device or a connected computer may select a real-time emotional state of the user. The real-time emotional state of the user may be, for example, at least one of the happiness, joy, anger, sorrow, sadness, fear, disgust, boredom, stress, or other emotional states.

In another example, a second voice processing or signal processing algorithm may be used to process or analyze the voice data to determine a health condition or status of the user. Detectable or determinable health conditions may include, among others, default or normal, sore throat, cold, thyroid issues, sleepiness, and other health conditions. Example algorithms may analyze breath sounds of the user based at least in part on the voice data and may use a cepstral feature set using SVMs and/or neural networks.

In some embodiments, the voice assistant device may determine whether the voice data includes a certain voice feature, such as a cough or sniffle. A cough or sniffle, or crying, may indicate that the user has a specific physical or emotional abnormality. In certain implementations, the voice interaction device may have an expression detector that analyzes an audio signal produced by a microphone of the device to detect one or more voice features, which generally may be a predefined sound or sequence of sounds. Such an expression detector may be implemented using keyword spotting technology, as an example. A keyword spotter may be a functional component or algorithm that evaluates an audio signal to detect the presence of a predefined sound or sequence of sounds, or expression, in the audio signal. Rather than producing a transcription of the words of the speech, a keyword spotter generates a true/false output to indicate whether or not the predefined word or expression was represented in the audio signal.

In another example, a third voice processing or signal processing algorithm may be used to process or analyze the voice data to determine a background environment of the user. Detectable or determinable background environments may include, among others, default or normal, multiple people talking, traffic, air conditioner/heater operation, and other background conditions. For example, the device or a connected computer system may determine background noise in the voice data, and may determine that the user is in an ambient environment with multiple users. Background environment information, such as a number of surrounding users, an expected location, and the like may be determined using hidden markov models, artificial neural networks, and the like.

In another example, a fourth voice processing or signal processing algorithm may be used to process or analyze the voice data to determine a language accent of the user. Language accents may be a real-time user status or condition. For example, the device or a connected computer system may determine that a user has a European accent, an Indian accent, a Chinese accent, a Latin accent, a British accent, an Australian accent, or another accent. Language accent classifications may be based at least in part on prosodic features and may use a source generator framework and may be based at least in part on a number of accent sensitive word counts or words said with an accent by a user. Source generators may be used to parse prosodic features and may be used with normalized pitch and energy in contours and/or spectral structures. Some embodiments may use a blend or fused variant of a Gaussian mixture model and SVMs.

In another example, a fifth voice processing or signal processing algorithm may be used to process or analyze the voice data to determine a gender and/or age category of the speaker or user (e.g., teenager, middle-aged, elder, etc.). For example, gender may be determined using non-negative matrix factorization, weighted supervised non-negative matrix factorization, general regression neural networks, and the like. Age or age range may be determined, for example, using Gaussian mixture models, hidden markov models, MFCCs, dimension reduction, and the like.

At optional block 240 of the process flow 200, one or more data tags corresponding to the one or more real-time traits may be generated. For example, computer-executable instructions stored on a memory of a device may be executed to generate one or more data tags representative of the user's real-time status. The data tags may include one or more tags related to the user's physical condition or characteristics and/or the user's emotional condition or state. The data tags may be metadata with one or more labels, text, or other data that can be linked to, included with, or otherwise associated with a data file, such as the voice data. The data tags may be indicative of the user's real-time user status. Data tags may be linked or associated with the voice data and may be sent to one or more servers as part of a content request. In one example, a content request from a voice interaction device may include the voice data and the applicable data tags.

At optional block 250 of the process flow 200, candidate audio content for presentation may be determined using the one or more real-time traits and/or the one or more data tags. For example, based at least in part on the user's real-time status, candidate audio content may be determined. Audio content associated with targeting criteria that at least partially matches a user's real-time status, and/or at least partially matches one or more data tags associated with voice data may be determined to be candidate audio content. The candidate audio content may be selected from a set of audio content that is stored, in one example, at a content datastore. Targeting criteria of the audio content may be used and/or compared against the data tags to determine whether the audio content is candidate audio content.

For example, the first audio content may be targeted towards users with sore throats. If voice data is associated with a data tag indicating the user has a sore throat, then the first audio content may be candidate audio content and/or eligible for presentation to the user. In another example, if second audio content is targeted towards users who are sleepy, and if voice data is associated with a data tag indicating the user is sleepy, then the second audio content may be candidate audio content and/or eligible for presentation to the user. In another example, if third audio content is targeted towards users with certain language accents, and if voice data is associated with a data tag indicating the user has a certain language accent, then the third audio content may be candidate audio content and/or eligible for presentation to the user.

In one example conversation, a user may say "Alexa, tell me joke." The voice interaction device or a connected computer system may determine that the user is sleepy and bored based at least in part on the user's voice input. Audio content targeted to sleepy and bored users may be determined based at least in part on a data tag that identifies the voice data as a sleepy and bored user. For example, a musician may want to target an audio ad for his new album to users with "boredom" and "sleepy" conditions. Audio content for presentation may be selected from the candidate content and presented to the user. For example, the voice interaction device may audibly present "here's a joke [ . . . ] By the way, this singer just released his new album for just $1.99. Do you want to preview it?" The user may respond affirmatively or negatively as desired.

In some embodiments, candidate audio content may be identified based at least in part on a correlation between the real-time status of the user and one or more candidate advertisements or candidate advertisers. To select content for presentation, some embodiments may determine that data tags associated with voice data satisfy targeting criteria for certain audio content. For example, if the audio content targeting criteria indicates that the audio content is to be presented to users who are in background environments with multiple users, and the data tag indicates as such, the audio content may be candidate audio content and may potentially be selected for presentation.

In some embodiments, a score may be generated for audio content or candidate audio content that is indicative of a quality of match between the targeting criteria for the audio content and the user real-time status and/or other characteristics of the user (e.g., demographic, geographic region, etc.). The score may be representative of a relevance between the audio content and the user to which the audio content may be presented. In some embodiments, scores may be used to rank content and/or candidate audio content, and may be used to determine or select content for presentation. For example, the highest-ranked audio content, or the audio content with the highest score, may be selected for presentation to the user. Scores may be based at least in part on audio creative quality or bandwidth, relevance to the user, and/or bid price.

In some embodiments, control of one or more remote servers or computer systems may be at least partially under the control of, for example, a voice interaction device. For example, the voice interaction device may cause a server to determine candidate audio content for presentation, to determine first targeting criteria for the respective candidate audio content, cause the server to determine scores for the respective candidate audio content, and cause the server to select content for presentation based at least in part on the respective scores.

Audio content for presentation may be selected from the candidate audio content, in one example, using an auction process, while in other embodiments, audio content for presentation may be selected based at least in part on relevance to the user, an expected revenue from presentation of the content, or other factors.

At block 260 of the process flow 200, selected audio content may be presented via a speaker device. For example, computer-executable instructions stored on a memory of a device may be executed to present selected audio content via one or more connected speaker devices. Audio content may be "text-to-speech" files converted to audio by a voice interaction device, or could be audio files prepared by third-party entities (such as advertisers) and presented via the voice interaction device. Audio advertisements may be communicated to voice interaction devices via audio streams.

Audio content, such as audio advertisements, may be presented, in some embodiments, only in response to a user voice input, or after a user has initiated a conversation with a voice interaction device. In other embodiments, audio content may be presented at any time. Audio advertisements may be configured to allow users to interact with the audio ads via a set of predefined response keywords, each of which can trigger an event (e.g., email more info to the user, send content to a particular mobile app, etc.).

In some embodiments, presentation of the audio content via a speaker of a speaker device may be caused by one or more remote servers or computing systems. For example, computer-executable instructions stored on a memory of a server may be executed to present the selected audio content via one or more speakers. The one or more speakers may be coupled to or otherwise associated with a voice interaction device. The audio advertisements may be injected into existing audio streams. For example, audio advertisements may be injected into the playback of audio streams generated by other services (e.g., a news briefing, during playback of tracks from a music playlist, etc.). Control of audio advertisement injection timing or positioning may be determined by the voice interaction device, one or more remote servers, or by third parties. Upon completion of content presentation, or upon completion of a conversation or interaction with a user, the control of audio output may be returned to the original audio content or controlling entity at the point of interruption.

Figure 3:
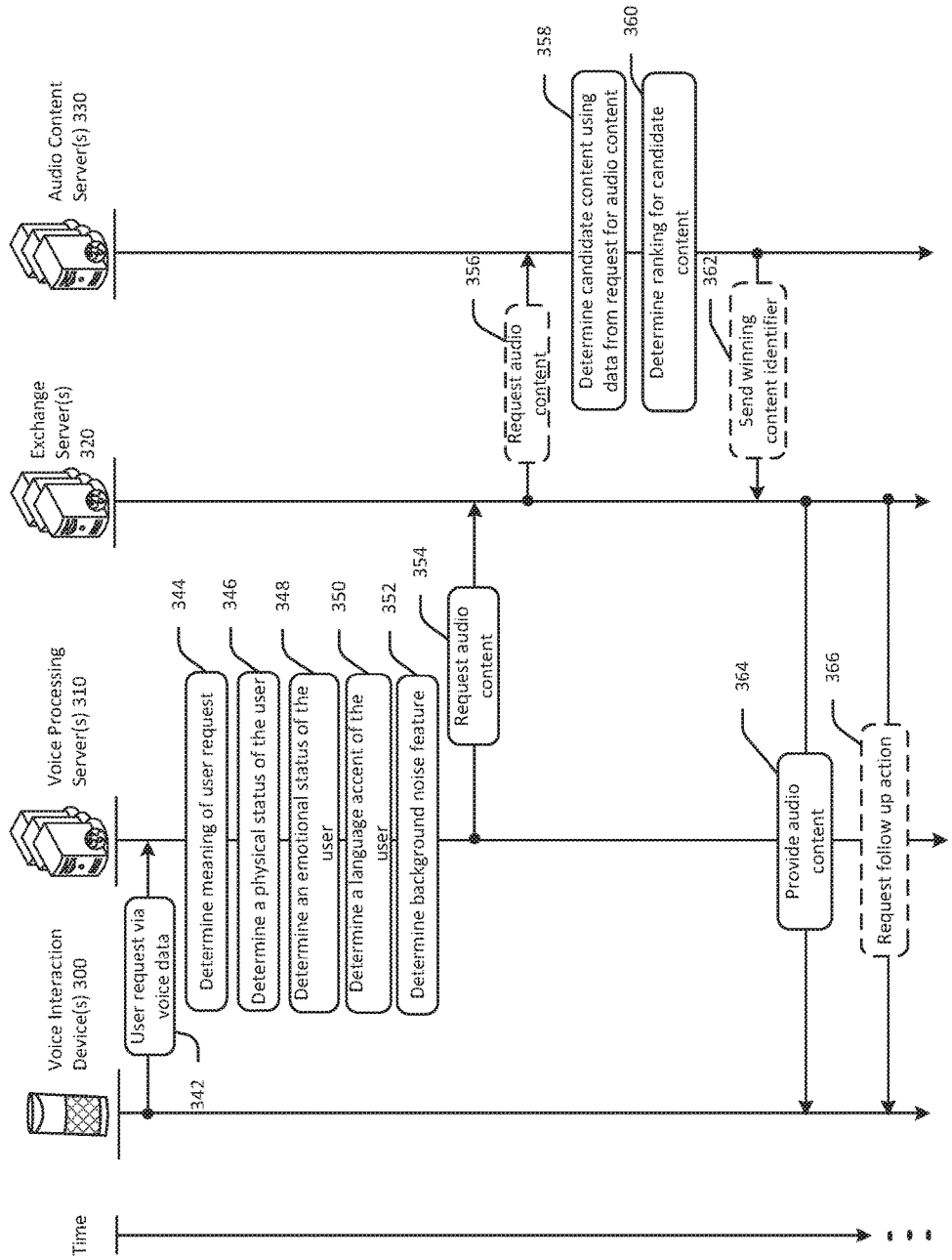
FIG. 3 is a schematic illustration of an example data flow for voice-based determination of physical and emotional characteristics of users in accordance with one or more example embodiments of the disclosure.

FIG. 3 illustrates an example dataflow for voice-based determination of physical and emotional characteristics of users in accordance with one or more embodiments of the disclosure. A dynamic voice assistance system may include one or more voice interaction devices 300, one or more voice processing servers 310, one or more exchange servers 320, and/or one or more audio content servers 330. Each of the system components may be in communication via one or more networks. The voice interaction device 300 may be the same as the voice interaction device 110 of FIG. 1. In some embodiments, the voice interaction device 300 may be configured to present singular audio content at any given time, in that when music is playing, a single music track is generally playing, as opposed to two songs playing at once.

At operation 342, the voice interaction device 300 may send a user request made via voice data to the voice processing server(s) 310. The user request may be sent as voice data that is generated based at least in part on analog sound input. At operation 344, the voice processing server(s) 310 may determine a meaning of the user request. At operation 346, the voice processing server(s) 310 may determine a physical status of the user. For example, the voice processing server(s) 310 may process the voice data to determine that the user has an illness, or to determine other characteristics, such as the user's age or gender. At operation 348, the voice processing server(s) 310 may determine an emotional status of the user. For example, the voice processing server(s) 310 may process the voice data to determine whether the user is in a normal or an abnormal emotional state, and if abnormal, select or determine an appropriate emotional state. At operation 350, the voice processing server(s) 310 may determine a language accent of the user. For example, the voice processing server(s) 310 may process the voice data to determine whether the user has a language accent that is different than an expected value based at least in part on the device's physical location, and if so, select or determine a likely language accent. At operation 352, the voice processing server(s) 310 may determine a background noise feature, or determine whether any information regarding a background environment of the user is determinable from the voice data. At operation 354, the voice processing server(s) 310 may request audio content from the exchange server(s) 320. The request for audio content may include the voice data, contextual information such as time of day, a user identifier, etc., and any tags that are associated with the voice data and may be indicative of the user's real-time status.

At optional operation 356, the exchange server(s) 320 may request audio content or an audio segment from the audio content server(s) 330. The audio content server(s) 330 may receive the request, and at operation 358, the audio content server(s) 330 may determine candidate content using data from the request for audio content from the exchange server(s) 320 and/or the voice processing server(s) 310. For example, the audio content server(s) 330 may compare the tags and/or contextual information to targeting criteria for audio content to determine candidate audio content. At operation 360, the audio content server(s) 330 may determine a ranking for candidate content. For example, the audio content server(s) 330 may generate scores for candidate audio content based at least in part on relevancy between the audio content or its targeting criteria and the tags and/or contextual data of the request. The scores may be used to rank the candidate content. In some embodiments, the audio content server(s) 330 may determine contextual data to determine candidate content and/or to rank the candidate content. At optional operation 362, the audio content server(s) 330 may send a winning content identifier and/or a bid amount to the exchange server(s) 320.

In some embodiments, the exchange server(s) 320 may conduct an auction for an audio segment. The auction may include sending a bid request to one or more ad server(s), such as the audio content server(s) 330, where the bid request includes a request for bids for an audio segment to be presented to a user. The exchange server(s) 320 may receive a number of bids from the ad servers, such as the communication at operation 362, where the bids may include a bid amount, audio content identifiers, and/or optionally include text of a candidate audio segment. The exchange server(s) 320 may determine a winning audio ad. For example, the winning audio ad may be associated with the highest bid.

At operation 364, the exchange server(s) 320 may send a winning audio content identifier to the voice processing server(s) 310, or may otherwise provide audio content to the voice interaction device(s) 300. The winning audio content may be presented at the voice interaction device 300 as an audio stream. The audio content may be presented by converting text of the candidate audio segment to audio data, or by playing a prepared audio file, for example. At optional operation 366, the voice processing server(s) 310 and/or the exchange server(s) 320 may send a request for a follow-up action to the voice interaction device(s) 300.

For example, the winning audio content may be audio content for a cough medicine that is targeted to users with sore throats. A user may interact with the voice interaction device(s) 300 by uttering "Alexa, what's the weather today?" The voice interaction device(s) 300 may interact with the voice processing server(s) 310 to determine a meaning of the utterance and/or to determine an appropriate response. For example, an audible response may be "today you can expect snow showers, with a high of 32 degrees, and a low of 20 degrees." The winning audio content may be presented after the requested information. For example, the voice interaction device(s) 300 may audibly present "by the way, I hear you have a sore throat, are you interested in buying cough medicine or learning more?" This may be the winning audio content. If the user responds in the affirmative, such as by uttering "yes, more information," a follow-up audible response may be presented providing more information to the user. For example, the voice interaction device(s) 300 may audibly present "the cough medicine is sold by [this retailer]. Here are some reviews and the price [ . . . ] would you like to buy it?" If the user answers in the affirmative, or provides voice data confirming the purchase, the voice interaction device(s) 300 may initiate a purchase of an item, such as the cough medicine, based at least in part on or otherwise using the second voice data. Other response or follow-up actions may include sending notifications or messages, such as emails or text messages, initiating services, implementing home automation changes or configurations, triggering a dash button click, displaying a video, causing display of images or content at a display device, and the like.

Figure 4:
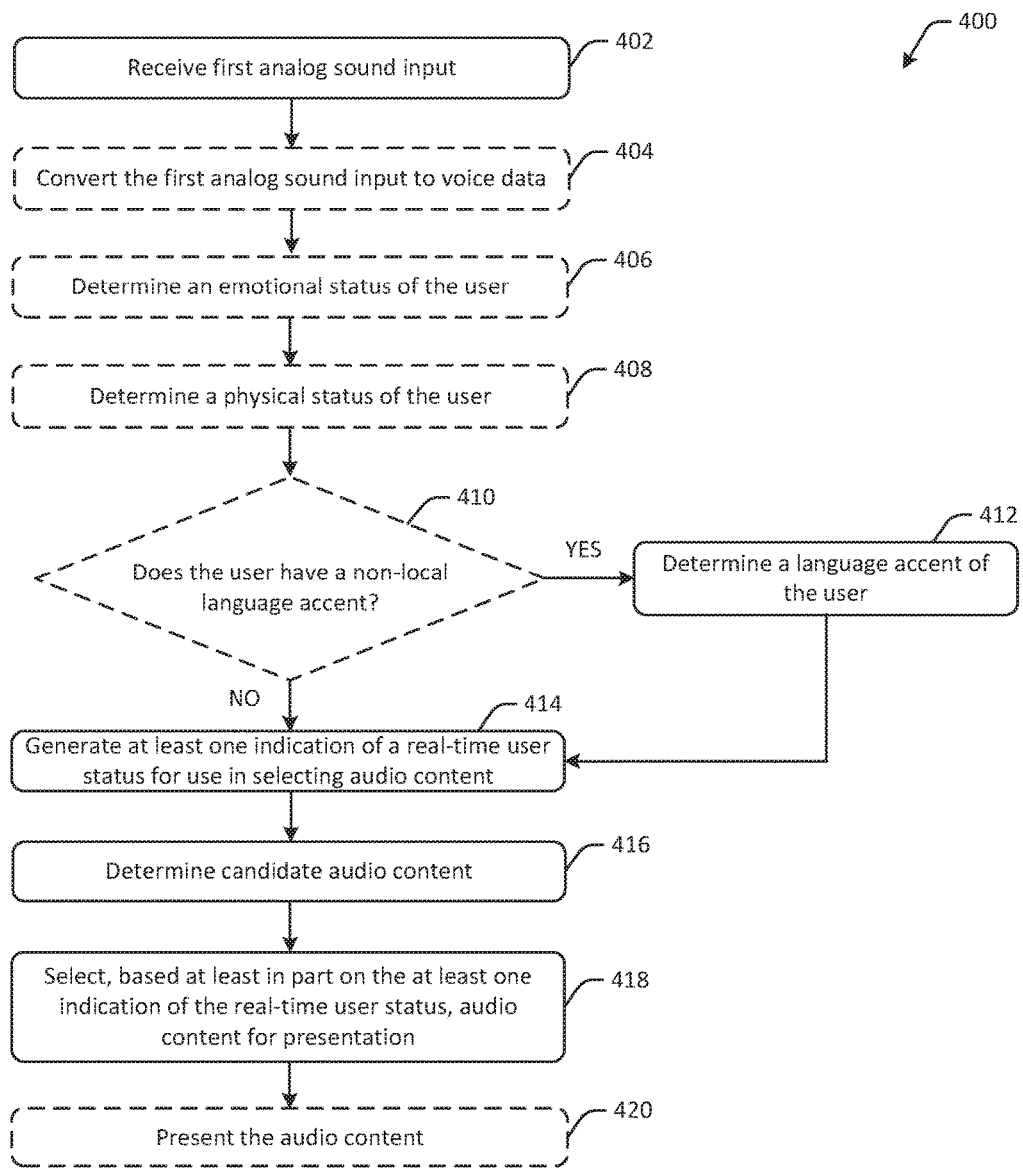
FIG. 4 is a schematic illustration of an example process flow for voice-based determination of physical and emotional characteristics of users in accordance with one or more example embodiments of the disclosure.

FIG. 4 depicts an example process flow 400 for voice-based determination of physical and emotional characteristics of users in accordance with one or more embodiments of the disclosure. Block 402 of the process flow includes receiving first analog sound input. For example, analog sound input or voice data may be received via one or more microphones configured to generate signals based at least in part on incident or ambient sounds. In certain example embodiments, the one or more microphones may be configured to receive sound input in the form of analog sound and may generate electrical signals indicative of the analog sound. Processing circuitry may convert the analog sound to digital voice data using an analog-to-digital converter (ADC). Digital voice data may be generated from the analog sound input using the ADC.

Optional block 404 of the process flow includes converting the first analog sound input to voice data. The voice data may include a digital representation of a user utterance, which may be the analog sound input and/or voice data. Optional block 406 includes determining an emotional status of the user. For example, a first signal processing algorithm may be applied to the first voice data to determine that an emotional status of the user indicates the user is excited. At optional block 408, a physical status of the user is determined. For example, a second signal processing algorithm may be applied to the first voice data to determine that a physical status of the user is abnormal, and that the user has a sore throat.

At optional determination block 410, a determination is made as to whether the user has a non-local language accent. For example, a physical location of a voice interaction device may be determined or approximated based at least in part on an internet protocol address, a primary shipping address associated with a user account, browser settings, and/or other information. Based at least in part on a physical location of the voice interaction device, an expected language accent may be determined, where the expected language accent is local to the geographic region in which the device is located. If it is determined that the user has a non-local language accent, or a language accent different than an expected language accent, the process flow 400 may proceed to block 412, at which a language accent of the user may be determined. For example, one or more signal processing algorithms may be used to analyze or process the voice data to determine a likely language accent that the user has. The process flow 400 may then proceed to block 414.

If it is determined at determination block 410 that the user does not have a non-local language accent, or that the user has an expected language accent, the process flow 400 may proceed to block 414. At block 414, at least one indication of a real-time user status may be generated for use in selecting audio content. For example, the at least one indication may be a data tag or another signal that is indicative of a physical, emotional, or other characteristic or condition of the user at a current time. For example, indications representing a user's sore throat physical status or excited emotional status may be generated.

At block 416, candidate audio content may be determined. The candidate audio content may be determined based at least in part on the user's real-time status. For example, a voice interaction device or a voice processing server may send a content request that includes one or more of the voice data and/or one or more indications or tags to a server, where the server determines first audio content for presentation at the speaker device. The server may determine first audio content for presentation by determining candidate audio content based at least in part on targeting criteria and/or the voice data and related tags.

At block 418, audio content for presentation may be selected based at least in part on the at least one indication of the real-time user status. For example, a voice interaction device or connected computer system may optionally rank the candidate audio content using scores, and select content based at least in part on the scores. Scores may be determined based at least in part on relevancy to the user and to the user's real-time status, bid amounts, and other factors. Some embodiments may determine scores using voice features.

At optional block 420, the audio content may be presented, for example, by one or more speakers coupled to or in communication with the voice interaction device. The presented content may therefore be highly relevant to the user's real-time status. In one example, audio content may be targeted to middle-aged users who speak Mandarin or have a Chinese accent and live in the United States. Based at least in part on voice data from a user, a user may be determined to be middle aged, speak Mandarin or to have a Chinese accent, and live in the United States, and may therefore satisfy targeting criteria for the audio content. The user may interact with a voice interaction device and say "Alexa, what's the news today?" The voice interaction device may audibly respond "before your news brief, you might be interested in the Xiaomi TV box, which allows you to watch over 1,000 real-time Chinese TV channels for just $49.99. Do you want to buy it?" If the user responds affirmatively, the purchase may be initiated, or the voice interaction device may proceed with a news briefing for the user.

One or more operations of the methods, process flows, or use cases of FIGS. 1-4 may have been described above as being performed by a user device, or more specifically, by one or more program module(s), applications, or the like executing on a device. It should be appreciated, however, that any of the operations of the methods, process flows, or use cases of FIGS. 1-4 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-4 may be described in the context of the illustrative devices, it should be appreciated that such operations may be implemented in connection with numerous other device configurations.

The operations described and depicted in the illustrative methods, process flows, and use cases of FIGS. 1-4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 5:
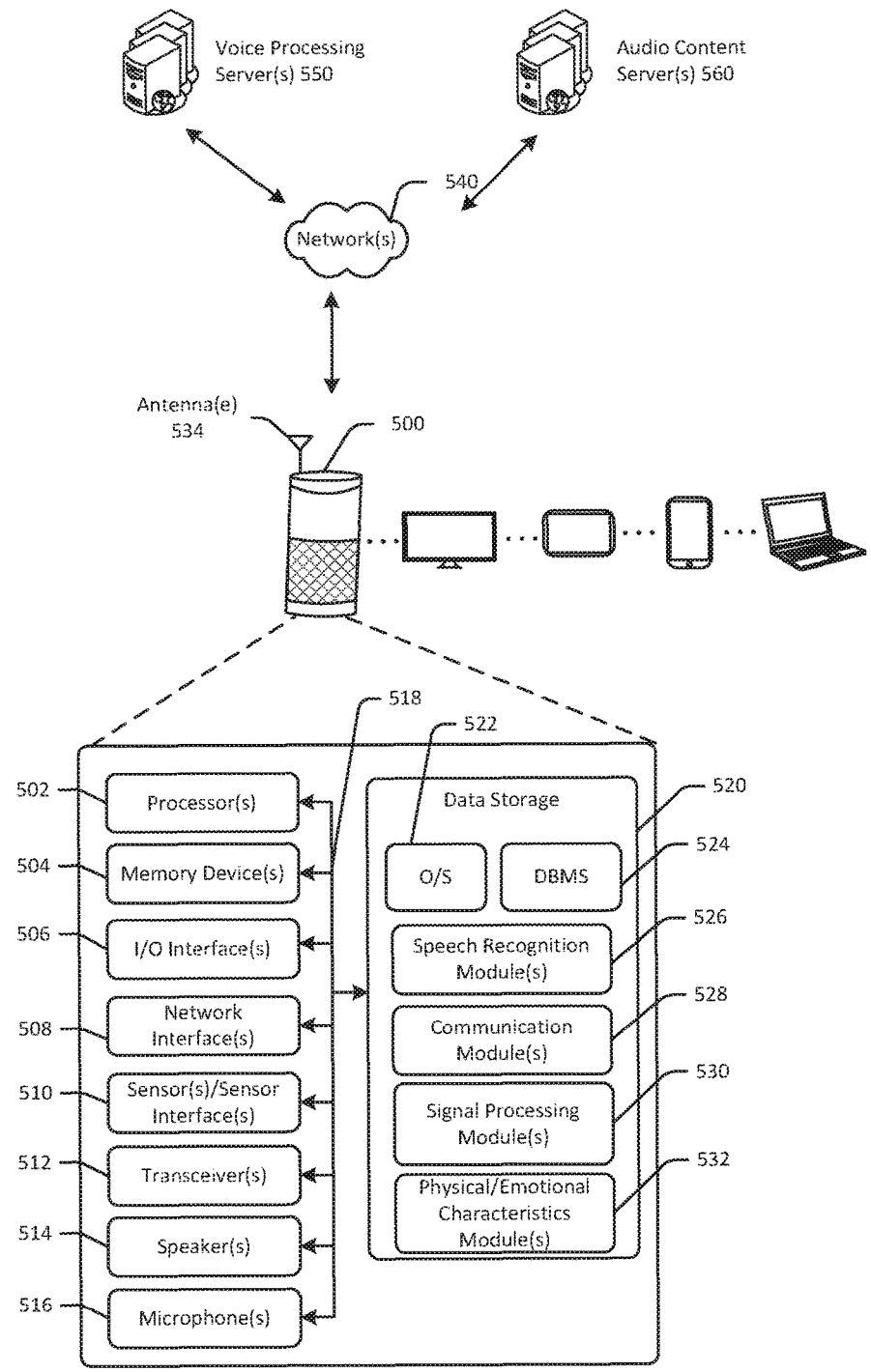
FIG. 5 is a schematic block diagram of an illustrative voice assistant device in accordance with one or more example embodiments of the disclosure.

FIG. 5 is a schematic block diagram of an illustrative voice interaction device 500 in accordance with one or more example embodiments of the disclosure. The voice interaction device 500 may include any suitable computing device capable of receiving and/or generating audio including, but not limited to, a streaming audio device, a mobile device such as a smartphone, tablet, e-reader, wearable device, or the like; a desktop computer; a laptop computer; a content streaming device; a set-top box; or the like. The voice interaction device 500 may correspond to an illustrative device configuration for the voice interaction devices of FIGS. 1-4.

The voice interaction device 500 may be configured to communicate via one or more networks 540 with one or more servers, user devices, or the like. For example, in the illustration of FIG. 5, the voice interaction device 500 may be configured to communicate with a voice processing server(s) 550 and an audio content server(s) 560. The voice processing server(s) 550 may be configured to perform a first type of voice processing, such as conversational voice processing, while the audio content server(s) 560 may be configured to perform or facilitate audio content streaming functionality. In some embodiments, a single remote server or single group of remote servers may be configured to perform more than one type of voice processing and/or audio content streaming functionality.

The voice interaction device 500 may be configured to communicate via one or more networks 540. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the voice interaction device 500 may include one or more processors (processor(s)) 502, one or more memory devices 504 (generically referred to herein as memory 504), one or more input/output (I/O) interface(s) 506, one or more network interface(s) 508, one or more sensors or sensor interface(s) 510, one or more transceivers 512, one or more speakers 514, one or more microphones 516, and data storage 520. The voice interaction device 500 may further include one or more buses 518 that functionally couple various components of the voice interaction device 500. The voice interaction device 500 may further include one or more antenna(e) 534 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 518 may include at least one of a system bus, a memory bus, an address bus, or a message bus, and may permit exchange of information (e.g., data (including computer-executable code), signaling, etc.) between various components of the voice interaction device 500. The bus(es) 518 may include, without limitation, a memory bus or a memory controller, a peripheral bus, an accelerated graphics port, and so forth. The bus(es) 518 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the voice interaction device 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 520 may include removable storage and/or non-removable storage including, but not limited to, a magnetic storage, optical disk storage, and/or tape storage. The data storage 520 may provide non-volatile storage of computer-executable instructions and other data. The memory 504 and the data storage 520, removable and/or non-removable, are examples of computer-readable storage media (CRSM) as that term is used herein.

The data storage 520 may store computer-executable code, instructions, or the like that may be loadable into the memory 504 and executable by the processor(s) 502 to cause the processor(s) 502 to perform or initiate various operations. The data storage 520 may additionally store data that may be copied to memory 504 for use by the processor(s) 502 during the execution of the computer-executable instructions. Moreover, output data generated as a result of execution of the computer-executable instructions by the processor(s) 502 may be stored initially in memory 504, and may ultimately be copied to data storage 520 for non-volatile storage.

More specifically, the data storage 520 may store one or more operating systems (O/S) 522; one or more database management systems (DBMS) 524; and one or more program module(s), applications, engines, computer-executable code, scripts, or the like such as, for example, one or more speech recognition module(s) 526, one or more communication module(s) 528, one or more signal processing module(s) 530, and/or one or more physical/emotional characteristics module(s) 532. Some or all of these module(s) may be sub-module(s). Any of the components depicted as being stored in data storage 520 may include any combination of software, firmware, and/or hardware. The software and/or firmware may include computer-executable code, instructions, or the like that may be loaded into the memory 504 for execution by one or more of the processor(s) 502. Any of the components depicted as being stored in data storage 520 may support functionality described in reference to correspondingly named components earlier in this disclosure.

The data storage 520 may further store various types of data utilized by components of the voice interaction device 500. Any data stored in the data storage 520 may be loaded into the memory 504 for use by the processor(s) 502 in executing computer-executable code. In addition, any data depicted as being stored in the data storage 520 may potentially be stored in one or more datastore(s) and may be accessed via the DBMS 524 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 5, the datastore(s) may include, for example, keyword information, targeting criteria, physical determination tags, emotional determination tags, and other information.

The processor(s) 502 may be configured to access the memory 504 and execute computer-executable instructions loaded therein. For example, the processor(s) 502 may be configured to execute computer-executable instructions of the various program module(s), applications, engines, or the like of the voice interaction device 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 5, the speech recognition module(s) 526 may include computer-executable instructions, code, or the like that responsive to execution by one or more of the processor(s) 502 may perform functions including, but not limited to, monitoring for voice data or analog sound input, processing voice data, and/or sending or receiving voice data from a wirelessly connected device. The speech recognition module(s) 526 may be configured to determine a meaning of detected or received voice data, as well as identify keywords.

The communication module(s) 528 may include computer-executable instructions, code, or the like that responsive to execution by one or more of the processor(s) 502 may perform functions including, but not limited to, communicating with one or more devices, for example, via wired or wireless communication, communicating with remote servers, communicating with remote datastores, sending or receiving notifications, communicating with cache memory data, and the like.

The signal processing module(s) 530 may include computer-executable instructions, code, or the like that responsive to execution by one or more of the processor(s) 502 may perform functions including, but not limited to, generating audio content, presenting audio via the speakers 514, processing audio and/or digital signals, selecting signal processing profiles, determining physical and/or emotional characteristics or states, and the like.

The physical/emotional characteristics module(s) 532 may include computer-executable instructions, code, or the like that responsive to execution by one or more of the processor(s) 502 may perform functions including, but not limited to, collecting or determining contextual information for bid requests, determining physical and/or emotional characteristics or states, generating tags, determining targeting criteria, and the like.

Referring now to other illustrative components depicted as being stored in the data storage 520, the O/S 522 may be loaded from the data storage 520 into the memory 504 and may provide an interface between other application software executing on the voice interaction device 500 and hardware resources of the voice interaction device 500. More specifically, the O/S 522 may include a set of computer-executable instructions for managing hardware resources of the voice interaction device 500 and for providing common services to other application programs (e.g., managing memory allocation among various application programs). In certain example embodiments, the O/S 522 may control execution of the other program module(s) to dynamically enhance characters for content rendering. The O/S 522 may include any operating system now known or which may be developed in the future including, but not limited to, any server operating system, any mainframe operating system, or any other proprietary or non-proprietary operating system.

The DBMS 524 may be loaded into the memory 504 and may support functionality for accessing, retrieving, storing, and/or manipulating data stored in the memory 504 and/or data stored in the data storage 520. The DBMS 524 may use any of a variety of database models (e.g., relational model, object model, etc.) and may support any of a variety of query languages. The DBMS 524 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the voice interaction device 500 is a mobile device, the DBMS 524 may be any suitable light-weight DBMS optimized for performance on a mobile device.

Referring now to other illustrative components depicted as being stored in the data storage 520, the O/S 522 may be loaded from the data storage 520 into the memory 504 and may provide an interface between other application software executing on the voice interaction device 500 and hardware resources of the voice interaction device 500. More specifically, the O/S 522 may include a set of computer-executable instructions for managing hardware resources of the voice interaction device 500 and for providing common services to other application programs (e.g., managing memory allocation among various application programs). In certain example embodiments, the O/S 522 may control execution of one or more of the program module(s) depicted as being stored in the data storage 520. The O/S 522 may include any operating system now known or which may be developed in the future including, but not limited to, any server operating system, any mainframe operating system, or any other proprietary or non-proprietary operating system.

The DBMS 524 may be loaded into the memory 504 and may support functionality for accessing, retrieving, storing, and/or manipulating data stored in the memory 504 and/or data stored in the data storage 520. The DBMS 524 may use any of a variety of database models (e.g., relational model, object model, etc.) and may support any of a variety of query languages. The DBMS 524 may access data represented in one or more data schemas and stored in any suitable data repository. In certain example embodiments, the DBMS 524 may be any suitable light-weight DBMS optimized for performance on a mobile device.

Referring now to other illustrative components depicted as being stored in the data storage 520, the O/S 522 may be loaded from the data storage 520 into the memory 504 and may provide an interface between other application software executing on the content selection server(s) 500 and hardware resources of the content selection server(s) 500. More specifically, the O/S 522 may include a set of computer-executable instructions for managing hardware resources of the content selection server(s) 500 and for providing common services to other application programs (e.g., managing memory allocation among various application programs). In certain example embodiments, the O/S 522 may control execution of the other program module(s) to dynamically enhance characters for content rendering. The O/S 522 may include any operating system now known or which may be developed in the future including, but not limited to, any server operating system, any mainframe operating system, or any other proprietary or non-proprietary operating system.

The DBMS 524 may be loaded into the memory 504 and may support functionality for accessing, retrieving, storing, and/or manipulating data stored in the memory 504 and/or data stored in the data storage 520. The DBMS 524 may use any of a variety of database models (e.g., relational model, object model, etc.) and may support any of a variety of query languages. The DBMS 524 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the content selection server(s) 500 is a mobile device, the DBMS 524 may be any suitable light-weight DBMS optimized for performance on a mobile device.

Referring now to other illustrative components of the content selection server(s) 500, the input/output (I/O) interface(s) 506 may facilitate the receipt of input information by the content selection server(s) 500 from one or more I/O devices as well as the output of information from the content selection server(s) 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the content selection server(s) 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(e) 534 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, etc.

The content selection server(s) 500 may further include one or more network interface(s) 508 via which the content selection server(s) 500 may communicate with any of a variety of other systems, platforms, networks, devices, and so forth. The network interface(s) 508 may enable communication, for example, with one or more wireless routers, one or more host servers, one or more web servers, and the like via one or more of networks.

The antenna(e) 534 may include any suitable type of antenna depending, for example, on the communications protocols used to transmit or receive signals via the antenna(e) 534. Non-limiting examples of suitable antennas may include directional antennas, non-directional antennas, dipole antennas, folded dipole antennas, patch antennas, multiple-input multiple-output (MIMO) antennas, or the like. The antenna(e) 534 may be communicatively coupled to one or more transceivers 512 or radio components to which or from which signals may be transmitted or received.

As previously described, the antenna(e) 534 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 534 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 534 may be configured to transmit or receive radio frequency signals within any suitable frequency range forming part of the unlicensed portion of the radio spectrum.

The antenna(e) 534 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna(e) 534—transmitting or receiving radio frequency (RF) signals in the bandwidth and/or channels corresponding to the communications protocols utilized by the content selection server(s) 500 to communicate with other devices. The transceiver(s) 512 may include hardware, software, and/or firmware for modulating, transmitting, or receiving—potentially in cooperation with any of antenna(e) 534—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the content selection server(s) 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The speaker(s) 514 may be any device configured to generate audible sound. The microphone(s) 516 may be any device configured to receive analog sound input or voice data.

It should be appreciated that the program module(s), applications, computer-executable instructions, code, or the like depicted in FIG. 5 as being stored in the data storage 520 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the content selection server(s) 500, and/or hosted on other computing device(s) accessible via one or more networks, may be provided to support functionality provided by the program module(s), applications, or computer-executable code depicted in FIG. 5 and/or additional or alternate functionality. Further, functionality may be modularized differently such that processing described as being supported collectively by the collection of program module(s) depicted in FIG. 5 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 5 may be implemented, at least partially, in hardware and/or firmware across any number of devices.

It should further be appreciated that the content selection server(s) 500 may include alternate and/or additional hardware, software, or firmware components beyond those described or depicted without departing from the scope of the disclosure. More particularly, it should be appreciated that software, firmware, or hardware components depicted as forming part of the content selection server(s) 500 are merely illustrative and that some components may not be present or additional components may be provided in various embodiments. While various illustrative program module(s) have been depicted and described as software module(s) stored in data storage 520, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-4 may be performed by a device having the illustrative configuration depicted in FIG. 5, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A speaker device comprising:
a microphone;
at least one memory that stores computer-executable instructions;
at least one processor configured to access the at least one memory and execute the computer-executable instructions to:
receive, using the microphone, first voice input from a user comprising a user utterance;
determine background noise in the first voice data;
determine that the user is in an ambient environment with multiple users;
generate a first tag indicative of a multiple user audience;
process the first voice data of the first voice input using a first signal processing algorithm;
determine that a physical status of the user is abnormal;
select a sore throat physical status for the user;
generate a second tag indicative of the sore throat physical status;
apply a second signal processing algorithm to the first voice data;
determine that an emotional status of the user indicates the user is excited;
select an excited emotional status for the user;
generate a third tag indicative of the excited emotional status;
send a content request comprising the first voice data, the first tag, the second tag, and the third tag to a server, wherein the server determines first audio content for presentation at the speaker device;
receive an indication of the first audio content; and
present the first audio content, wherein targeting criteria for the first audio content comprises the sore throat physical status, the excited emotional status, and the multiple user audience.

2. The speaker device of claim 1, wherein the at least one processor is further configured to access the at least one memory and execute the computer-executable instructions to:
apply a third signal processing algorithm to the first voice data;
determine that a language accent of the first voice data indicates the user has a Chinese language accent; and
generate a third tag indicative of the Chinese language accent, wherein the content request further comprises the third tag.

3. The speaker device of claim 1, wherein the at least one processor is further configured to access the at least one memory and execute the computer-executable instructions to:
cause the server to determine candidate audio content for presentation, the candidate audio content comprising the first audio content and second audio content;
cause the server to determine first targeting criteria for the first audio content;
cause the server to determine second targeting criteria for the second audio content;
cause the server to determine a first score for the first audio content using the first targeting criteria;
cause the server to determine a second score for the second audio content using the second targeting criteria; and
cause the server to select the first audio content using the first score.

4. A method comprising:
determining, by one or more computer processors coupled to at least one memory, first voice data, wherein the first voice data is generated by a user;
determining a first real-time user status of the user using the first voice data;
generating a first data tag indicative of the first real-time user status;
determining candidate audio content for presentation using the first data tag, the candidate audio content comprising first audio content and second audio content;
determining that a first score for the first audio content is greater than a second score for the second audio content, wherein the first score is determined using a first targeting criteria, and the second score is determined using a second targeting criteria;
determining the first audio content for presentation at a speaker device; and
causing presentation of the first audio content via a speaker of the speaker device.

5. The method of claim 4, wherein determining the first real-time user status of the user using the first voice data comprises:
applying at least one signal processing algorithm to the first voice data;
determining that an emotional state of the user is abnormal; and
selecting a real-time emotional state of the user, wherein the real-time emotional state is the first real-time user status.

6. The method of claim 4, wherein determining the first real-time user status of the user using the first voice data comprises:
applying at least one signal processing algorithm to the first voice data;
determining that a physical state of the user is abnormal; and
selecting a real-time physical state of the user, wherein the real-time physical state is the first real-time user status.

7. The method of claim 4, further comprising sending a content request to a server, the content request comprising the first voice data and the first data tag.

8. The method of claim 7, further comprising:
receiving an indication that the first data tag satisfies targeting criteria for the first audio content.

9. The method of claim 4, further comprising determining that the first data tag satisfies targeting criteria for the first audio content.

10. The method of claim 4, further comprising:
determining background noise in the first voice data;
determining that the user is in an ambient environment with multiple users using the background noise; and
determining that targeting criteria for the first audio content comprises ambient environments with multiple users.

11. The method of claim 4, wherein the first voice data comprises a request for second audio content, the method further comprising:
determining the second audio content; and
causing presentation of the second audio content via the speaker.

12. The method of claim 4, further comprising:
determining second voice data after presentation of the first audio content; and
initiating a purchase of an item using the second voice data, sending a notification, or providing additional information.

13. The method of claim 4, wherein determining the first real-time user status of the user using the first voice data comprises:
applying at least one signal processing algorithm to the first voice data; and
determining a language accent of the user, wherein the language accent is the first real-time user status.

14. The method of claim 4, further comprising determining a second real-time user status of the user using the first voice data.

15. The method of claim 4, wherein the one or more computer processors coupled to the at least one memory are at the speaker device.

16. The method of claim 4, wherein the first voice data comprises a wakeword.

17. A device comprising:
at least one memory that stores computer-executable instructions; and
at least one processor configured to access the at least one memory and execute the computer-executable instructions to:
determine first voice data, wherein the first voice data is generated by a user;
determine a first real-time user status of the user using the first voice data;
generate a first data tag indicative of the first real-time user status;
determine candidate audio content for presentation using the first data tag, the candidate audio content comprising first audio content and second audio content;
determine that a first score for the first audio content is greater than a second score for the second audio content, wherein the first score is determined using a first targeting criteria, and the second score is determined using a second targeting criteria;
determine the first audio content for presentation at a speaker device; and
present the first audio content via a speaker.

18. The device of claim 17, wherein the at least one processor is configured to determine the first real-time user status of the user using the first voice data by accessing the at least one memory and executing the computer-executable instructions to:
apply at least one signal processing algorithm to the first voice data;
determine that a physical state of the user is abnormal; and
select a real-time physical state of the user, wherein the real-time physical state is the first real-time user status.

19. The device of claim 17, wherein the at least one processor is further configured to access the at least one memory and execute the computer-executable instructions to:
determine background noise in the first voice data;
determine that the user is in an ambient environment with multiple users using the background noise; and
determine that targeting criteria for the first audio content comprises ambient environments with multiple users.

* * * * *